(12) United States Patent
Miller

(10) Patent No.: US 7,178,673 B1
(45) Date of Patent: Feb. 20, 2007

(54) BEACH COOLER SYSTEM

(76) Inventor: Amy M. Miller, P.O. Box 3690, Seminole, FL (US) 33775-3690

( * ) Notice: Subject to any disclaimer, the term of this patent is extended or adjusted under 35 U.S.C. 154(b) by 37 days.

(21) Appl. No.: 11/043,579

(22) Filed: Jan. 26, 2005

(51) Int. Cl.
A45C 11/20 (2006.01)
(52) U.S. Cl. .................. 206/545; 62/457.7; 62/459
(58) Field of Classification Search ......... 206/541, 206/545, 549, 543, 544; 62/457.1, 457.7, 62/459; 280/47.17, 47.24, 47.26, 47.32
See application file for complete search history.

(56) References Cited

U.S. PATENT DOCUMENTS

| 400,752 | A | * | 4/1889 | Crossman | 206/541 |
| 2,645,332 | A | * | 7/1953 | Martin et al. | 206/545 |
| 3,255,607 | A | * | 6/1966 | Bair et al. | 206/545 |
| 5,671,846 | A | * | 9/1997 | Frank | 206/541 |
| 5,704,485 | A | * | 1/1998 | Cautereels et al. | 62/457.1 |
| 6,574,983 | B2 | * | 6/2003 | Smith et al. | 62/457.7 |

* cited by examiner

Primary Examiner—Luan K. Bui
(74) Attorney, Agent, or Firm—Edward P. Dutkiewicz

(57) ABSTRACT

A cooler has front, rear, end and bottom walls. The walls form an interior chamber. The interior chamber has an upper ledge, a lower ledge and an intermediate ledge. A lower tray is positionable upon the lower ledge. Slots extend through the lower tray and are adapted to support ice. An intermediate tray is positionable upon the intermediate ledge. A plurality of apertures extend through the intermediate tray. The apertures are adapted to removable support food containers. A lid is positionable upon the upper ledge for securement and thermal insulating purposes.

2 Claims, 3 Drawing Sheets

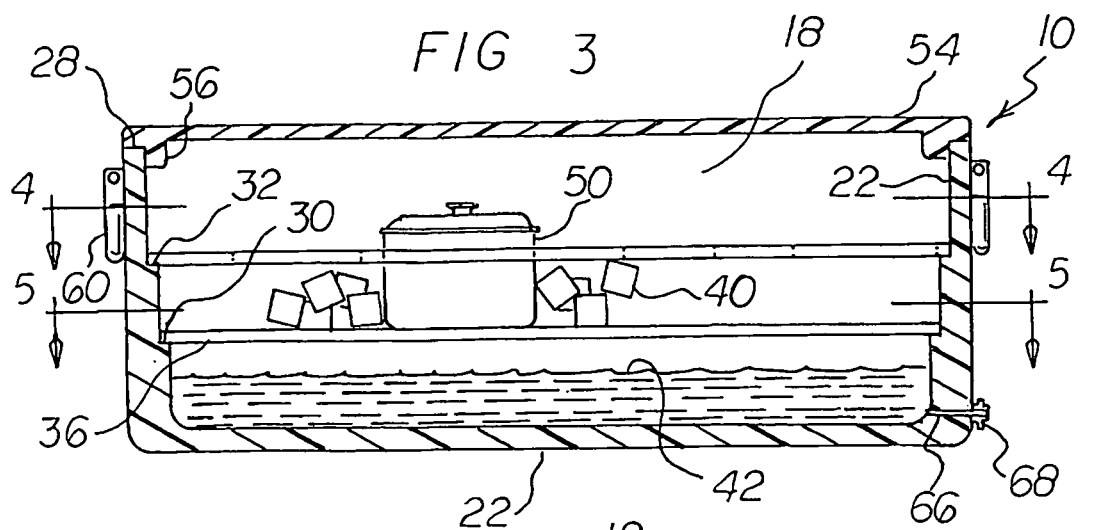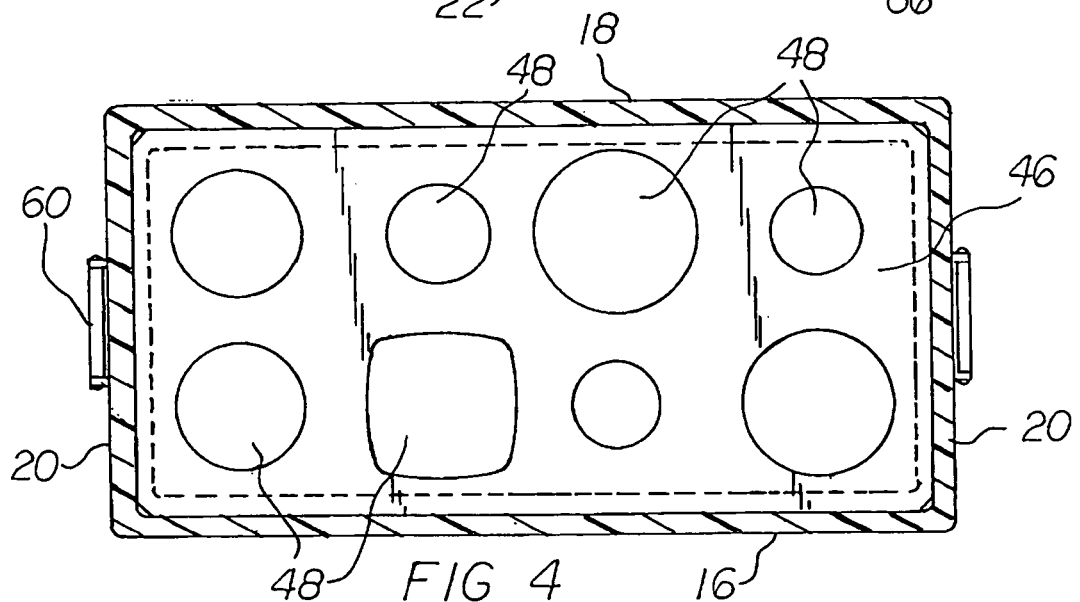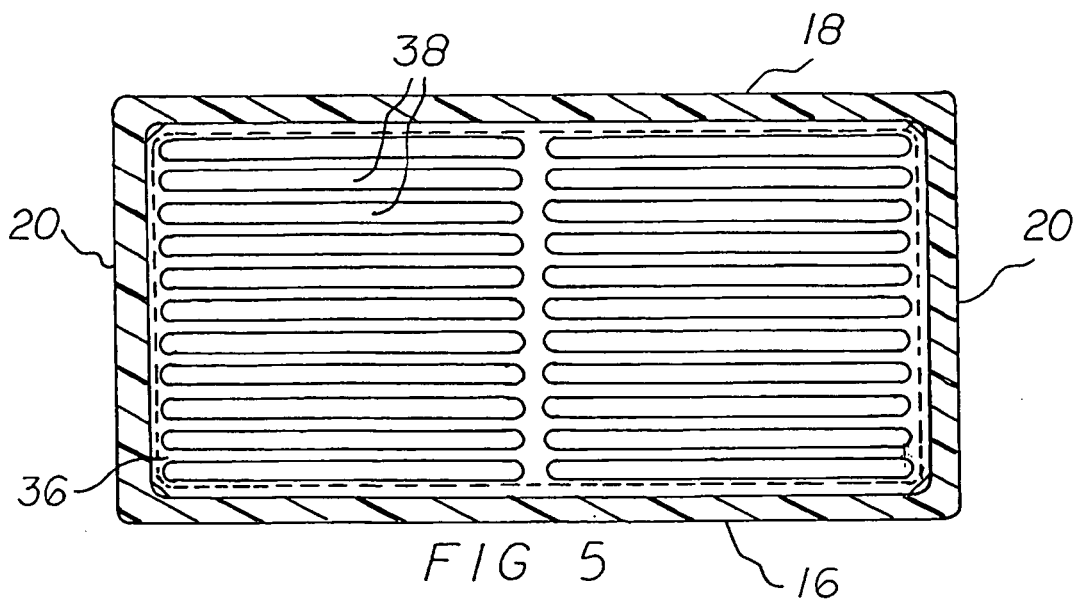

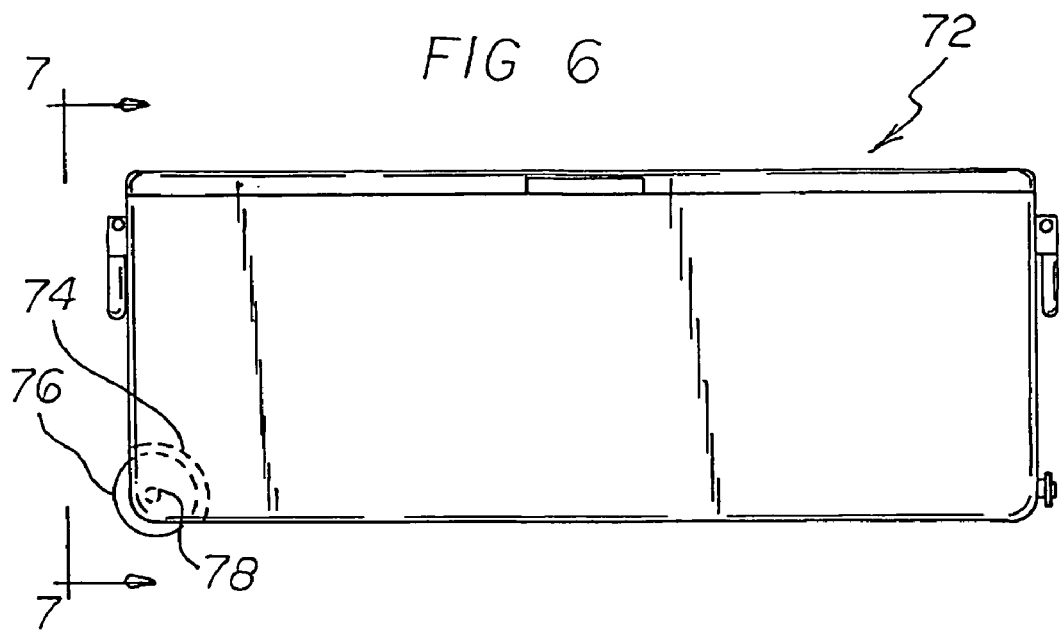
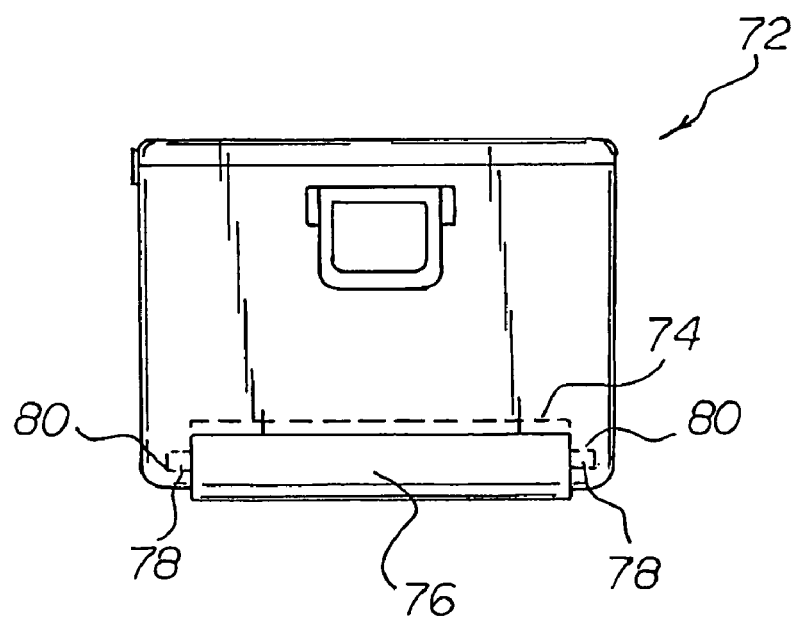

BEACH COOLER SYSTEM

BACKGROUND OF THE INVENTION

1. Field of the Invention

The present invention relates to a beach cooler system and more particularly pertains to a cooler with a support assembly for dishes and ice and with a roller assembly to facilitate transportation on sand.

2. Description of the Prior Art

The use of cooler systems of known designs and configurations is known in the prior art. More specifically, cooler systems of known designs and configurations previously devised and utilized for the purpose of cooling food items in a container are known to consist basically of familiar, expected, and obvious structural configurations, notwithstanding the myriad of designs encompassed by the crowded prior art which has been developed for the fulfillment of countless objectives and requirements.

By way of example, United States Patent Number Re. 32,740 issued Aug. 30, 1988 to Steffes relates to a multiple use shelf cooler. U.S. Pat. No. 4,932,677 issued Jun. 12, 1990 to Shustack relates to a mobile cooler. U.S. Pat. No. 5,660,403 issued Aug. 26, 1997 to O'Neill relates to a multipurpose beach cart. Lastly, U.S. Pat. No. 6,050,663 issued Apr. 18, 2000 to Schoellman relates to a shelf system for cold storage coolers.

While these devices fulfill their respective, particular objectives and requirements, the aforementioned patents do not describe a beach cooler system that includes a support assembly for dishes and ice and a roller assembly to facilitate transportation on sand.

In this respect, the beach cooler system according to the present invention substantially departs from the conventional concepts and designs of the prior art, and in doing so provides an apparatus primarily developed for cooling food while supporting dishes and ice and while facilitating transportation on sand.

Therefore, it can be appreciated that there exists a continuing need for a new and improved beach cooler system which can be used for a supporting dishes and ice and for facilitating transportation on sand. In this regard, the present invention substantially fulfills this need.

SUMMARY OF THE INVENTION

In view of the foregoing disadvantages inherent in the known types of cooler systems of known designs and configurations now present in the prior art, the present invention provides an improved beach cooler system. As such, the general purpose of the present invention, which will be described subsequently in greater detail, is to provide a new and improved beach cooler system and method which has all the advantages of the prior art and none of the disadvantages.

To attain this, the present invention essentially comprises an essentially rigid cooler. The cooler is fabricated of a water impervious, thermally insulating material. The thermally insulating material is preferably selected from the class of water impervious, thermally insulating construction materials. The class of water impervious, thermally insulating construction materials includes plastic and rubber, natural and synthetic, and blends thereof. The cooler is shaped to include a large vertical front wall and a parallel large vertical rear wall. Small parallel end walls are provided there between. The front, rear and end walls all have integrally coupled side edges. Upper edges define an open top and lower edges. A bottom wall is integrally formed therewith. The front, rear, end and bottom walls are in an essentially rectilinear configuration. The front, rear, end and bottom walls define an interior chamber.

The interior chamber includes a horizontal peripheral upper ledge. The horizontal peripheral upper ledge is defined by the upper edge. The interior chamber includes a horizontal peripheral lower ledge. The horizontal peripheral lower ledge is spaced beneath the upper ledge. The interior chamber also includes a horizontal peripheral intermediate ledge. The horizontal peripheral intermediate ledge is spaced intermediate the upper and lower ledges. The upper ledge is rectangular. The upper ledge has a large circumference. The intermediate ledge is rectangular. The intermediate ledge has a circumference less than the circumference of the upper ledge. The lower ledge is also rectangular. The lower ledge has a circumference less than the circumference of the intermediate ledge.

A rigid lower tray is provided. The lower tray is provided in a rectangular configuration. The lower tray is removably positionable upon the lower ledge. The lower tray has slots. The slots extend through the lower tray. The lower tray is adapted to support ice for cooling purposes. The slots are adapted to allow water from the ice when melted to drip onto the bottom wall.

Provided next is a rigid intermediate tray. The intermediate tray is provided in a rectangular configuration. The intermediate tray is removably positionable upon the intermediate ledge. The intermediate tray has a plurality of apertures. The apertures are of various sizes and shapes. The apertures extend through the intermediate tray. The intermediate tray is adapted to support removable food containers to be cooled. The food containers are of various sizes and shapes. The apertures are adapted to abate lateral shifting of containers. The apertures are further adapted to support the upper peripheries of shorter dished. The lower tray is adapted to support the bottom of taller dishes.

A rigid lid is provided next. The lid is fabricated of a water impervious, thermally insulating material. The water impervious, thermally insulating material is preferably selected from the class of water impervious, thermally insulating construction materials. The class of water impervious, thermally insulating construction materials includes plastic and rubber, natural and synthetic, and blends thereof. The lid is provided in a rectangular configuration. The lid is removably positionable upon the upper ledge. The lid has a plurality of downwardly extending extensions. The extensions extend a short distance into the chamber for securement and thermal insulating purposes.

A handle is also provided. The handle is pivotably secured to each end wall. In this manner lifting and transporting of the cooler by a user is facilitated.

Further provided is a relief valve. The relief valve includes a passageway. The passageway extends through one end wall adjacent to the bottom wall. In this manner the pouring of water from interior of the chamber to exterior of the cooler is allowed. The relief valve includes a stopper. The stopper is removably positionable within the passageway. In this manner the pouring of water when inserted into the passageway is precluded. Also in this manner the pouring of water when removed from the passageway is allowed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved beach cooler system which has all of the advantages of the prior art cooler systems of known designs and configurations and none of the disadvantages.

It is another object of the present invention to provide a new and improved beach cooler system which may be easily and efficiently manufactured and marketed.

It is further object of the present invention to provide a new and improved beach cooler system which is of durable and reliable constructions.

An even further object of the present invention is to provide a new and improved beach cooler system which is susceptible of a low cost of manufacture with regard to both materials and labor, and which accordingly is then susceptible of low prices of sale to the consuming public, thereby making such beach cooler system economically available to the buying public.

Even still another object of the present invention is to provide a beach cooler system having a support assembly for dishes and ice and having a roller assembly to facilitate transportation on sand.

Lastly, it is an object of the present invention to provide a new and improved beach cooler system. A cooler has front, rear, end and bottom walls. The walls form an interior chamber. The interior chamber has an upper ledge, a lower ledge and an intermediate ledge. A lower tray is positionable upon the lower ledge. Slots extend through the lower tray and are adapted to support ice. An intermediate tray is positionable upon the intermediate ledge. A plurality of apertures extend through the intermediate tray. The apertures are adapted to removable support food containers. A lid is positionable upon the upper ledge for securement and thermal insulating purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the system taken along line 3—3 OF FIG. 2.

FIG. 4 is a cross-sectional view of the system taken along line 4—4 OF FIG. 3.

FIG. 5 is a cross-=sectional view of the system taken along line 5—5 OF FIG. 3.

FIG. 6 is a front elevational view of a beach cooler system constructed in accordance with an alternate embodiment of the invention.

FIG. 7 is a side elevational view of the system taken along line 7—7 OF FIG. 6.

The same reference numerals refer to the same parts throughout the various Figures.

DESCRIPTION OF THE PREFERRED EMBODIMENT

Figure 1:
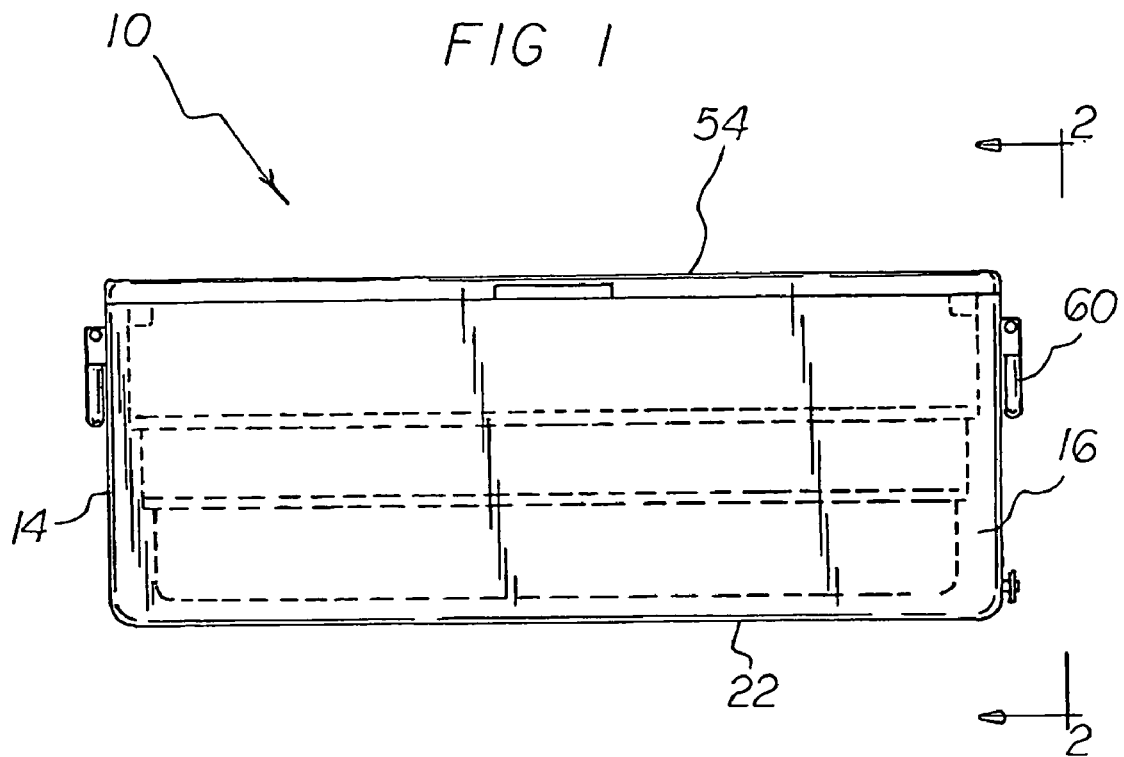
FIG. 1 is a front elevational view of a beach cooler system constructed in accordance with the principles of the present invention.
Figure 2:
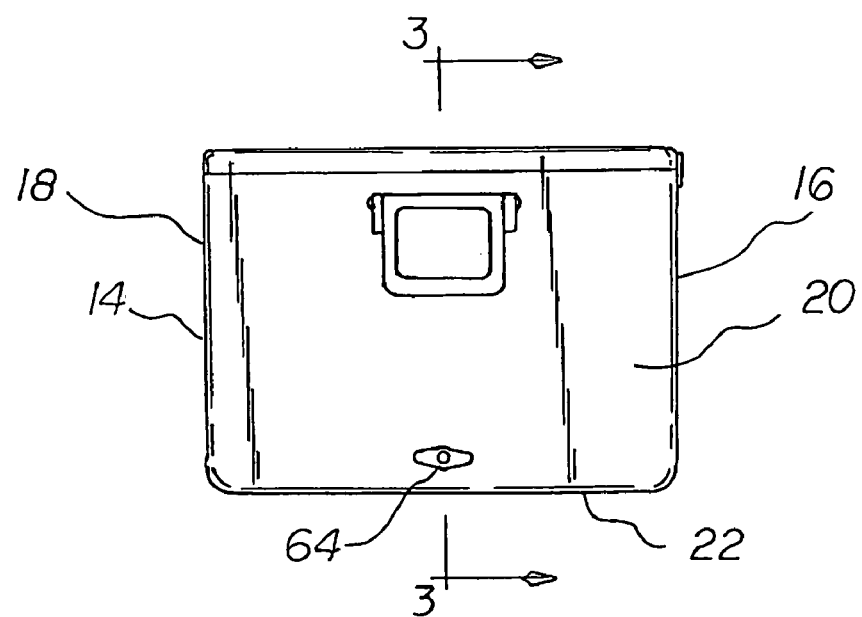
FIG. 2 is a side elevational view of the system taken along line 2—2 OF FIG. 1.

With reference now to the drawings, and in particular to FIG. 1 thereof, the preferred embodiment of the new and improved beach cooler system embodying the principles and concepts of the present invention and generally designated by the reference numeral 10 will be described.

The present invention, the beach cooler system 10 is comprised of a plurality of components. Such components in their broadest context include a cooler, a lower tray, an intermediate tray and a lid. Such components are individually configured and correlated with respect to each other so as to attain the desired objective.

First provided an essentially rigid cooler 14. The cooler is fabricated of a water impervious, thermally insulating material. The thermally insulating material is preferably selected from the class of water impervious, thermally insulating construction materials. The class of water impervious, thermally insulating construction materials includes plastic and rubber, natural and synthetic, and blends thereof. The cooler is shaped to include a large vertical front wall 16 and a parallel large vertical rear wall 18. Small parallel end walls 20 are provided there between. The front, rear and end walls all have integrally coupled side edges. Upper edges define an open top and lower edges. A bottom wall 22 wall is integrally formed therewith. The front, rear, end and bottom walls are in an essentially rectilinear configuration. The front, rear, end and bottom walls define an interior chamber 24.

The interior chamber includes a horizontal peripheral upper ledge 28. The horizontal peripheral upper ledge is defined by the upper edge. The interior chamber includes a horizontal peripheral lower ledge 30. The horizontal peripheral lower ledge is spaced beneath the upper ledge. The interior chamber also includes a horizontal peripheral intermediate ledge 32. The horizontal peripheral intermediate ledge is spaced intermediate the upper and lower ledges. The upper ledge is rectangular. The upper ledge has a large circumference. The intermediate ledge is rectangular. The intermediate ledge has a circumference less than the circumference of the upper ledge. The lower ledge is also rectangular. The lower ledge has a circumference less than the circumference of the intermediate ledge.

A rigid lower tray 36 is provided. The lower tray is provided in a rectangular configuration. The lower tray is removably positionable upon the lower ledge. The lower tray has slots 38. The slots extend through the lower tray. The lower tray is adapted to support ice 40 for cooling purposes. The slots are adapted to allow water 42 from the ice when melted to drip onto the bottom wall.

Provided next is a rigid intermediate tray 46. The intermediate tray is provided in a rectangular configuration. The intermediate tray is removably positionable upon the intermediate ledge. The intermediate tray has a plurality of apertures 48. The apertures are of various sizes and shapes. The apertures extend through the intermediate tray. The intermediate tray is adapted to support removable food containers 50 to be cooled. The food containers are of various sizes and shapes. The apertures are adapted to abate lateral shifting of containers. The apertures are further adapted to support the upper peripheries of shorter dished. The lower tray is adapted to support the bottom of taller dishes.

A rigid lid 54 is provided next. The lid is fabricated of a water impervious, thermally insulating material. The water impervious, thermally insulating material is preferably selected from the class of water impervious, thermally insulating construction materials. The class of water impervious, thermally insulating construction materials includes plastic and rubber, natural and synthetic, and blends thereof. The lid is provided in a rectangular configuration. The lid is removably positionable upon the upper ledge. The lid has a plurality of downwardly extending extensions 56. The extensions extend a short distance into the chamber for securement and thermal insulating purposes.

A handle 60 is also provided. The handle is pivotably secured to each end wall. In this manner lifting and transporting of the cooler by a user is facilitated.

Further provided is a relief valve 64. The relief valve includes a passageway 66. The passageway extends through one end wall adjacent to the bottom wall. In this manner the pouring of water from interior of the chamber to exterior of the cooler is allowed. The relief valve includes a stopper 68. The stopper is removably positionable within the passageway. In this manner the pouring of water when inserted into the passageway is precluded. Also in this manner the pouring of water when removed from the passageway is allowed.

In the alternate embodiment of FIGS. 6 and 7, there is a system 72 with improved transportation capabilities, particularly when moving the cooler on a beach or other surface, including sand. All other components are essentially the same as in the embodiment of FIGS. 1 through 6. A roller assembly is provided. The roller assembly includes a housing 74. The housing is in a generally cylindrical configuration. The housing is formed into the cooler at the bottom edge of one end wall. The roller assembly includes a cylindrical roller 76. The roller is positioned within the housing. The roller assembly also includes an axle 78. The axle rotatably supports the roller. The one end wall has axially aligned recesses 80. The recesses support the axle at its ends with the roller there between. The roller has a length of between 65 percent and 90 percent of the length of one end wall. The length is preferably between 65 percent and 90 percent.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A beach cooler system comprising:
   a cooler including a front and rear and end and bottom walls forming an interior chamber having an upper ledge and a lower ledge and an intermediate ledge;
   a lower tray positionable upon the lower ledge with slots extending there through adapted to support ice;
   an intermediate tray positionable upon the intermediate ledge with a plurality of apertures extending there through adapted to removable support food containers;
   a lid positionable upon the upper ledge for securement and thermal insulating purposes;
   a handle pivotably secured to each end wall to facilitate lifting and transporting of the cooler by a user;
   a relief valve including a passageway extending through one end wall adjacent to the bottom wall to allow the pouring of water from interior of the chamber to exterior of the cooler, the relief valve including a stopper removably positionable within the passageway to preclude the pouring of water when inserted into the passageway and to allow pouring of water when removed from the passageway; and
   a housing in a generally cylindrical configuration formed into the cooler at the bottom edge of one end wall with a cylindrical roller positioned within the housing and an axle rotatable supporting the roller, the one end wall having axially aligned recesses supporting the axle at its ends with the roller there between, the roller having a length of between 65 percent and 90 percent of the length of one end wall.

2. A beach cooler system featuring a support assembly for dishes and ice and a roller assembly to facilitate transportation on sand comprising, in combination:
   an essentially rigid cooler fabricated of a water impervious, thermally insulating material, preferably selected from the class of water impervious, thermally insulating construction materials including plastic and rubber, natural and synthetic, and blends thereof, the cooler being shaped to include a large vertical front wall and a parallel large vertical rear wall, with small parallel end walls there between, the front and rear and end walls all having integrally coupled side edges with upper edges defining an open top and lower edges with a bottom wall integrally formed therewith, the front and rear and end and bottom walls being in an essentially rectilinear configuration and defining an interior chamber there within;
   the interior chamber including a horizontal peripheral upper ledge defined by the upper edge, a horizontal peripheral lower ledge spaced beneath the upper ledge, and horizontal peripheral intermediate ledge spaced intermediate upper and lower ledges, the upper ledge being rectangular with a large circumference, the intermediate ledge being rectangular with a circumference less than the circumference of the upper ledge and the lower ledge being rectangular with a circumference less than the circumference of the intermediate ledge;

a rigid lower tray in a rectangular configuration removably positionable upon the lower ledge with slots extending there through, the lower tray adapted to support ice for cooling purposes, the slots adapted to allow water from the ice when melted to drip onto the bottom wall;

a rigid intermediate tray in a rectangular configuration removably positionable upon the intermediate ledge with a plurality of apertures of various sizes and shapes extending there through, the intermediate tray adapted to removable support food containers of various sizes and shapes to be cooled, the apertures adapted to abate lateral shifting of containers there within and to support the upper peripheries of shorter dished with the lower tray adapted to support the bottom of taller dishes;

a rigid lid fabricated of a water impervious, thermally insulating material, preferably selected from the class of water impervious, thermally insulating construction materials including plastic and rubber, natural and synthetic, and blends thereof, in a rectangular configuration removably positionable upon the upper ledge with a plurality of downwardly extending extensions extending a short distance into the chamber for securement and thermal insulating purposes;

a handle pivotably secured to each end wall to facilitate lifting and transporting of the cooler by a user;

a relief valve including a passageway extending through one end wall adjacent to the bottom wall to allow the pouring of water from interior of the chamber to exterior of the cooler, the relief valve including a stopper removably positionable within the passageway to preclude the pouring of water when inserted into the passageway and to allow pouring of water when removed from the passageway; and a roller assembly including a housing in a generally cylindrical configuration formed into the cooler at the bottom edge of one end wall with a cylindrical roller positioned within the housing and an axle rotatably supporting the roller, the one end wall having axially aligned recesses supporting the axle at its ends with the roller there between, the roller having a length of between 65 percent and 90 percent of the length of one end wall.

* * * * *